Sept. 25, 1945.　　　　R. A. DARBY　　　　2,385,499
FUSELAGE BULGE
Filed May 19, 1943　　　　2 Sheets-Sheet 1

INVENTOR
ROBERT ALAN DARBY
BY
ATTORNEY

Sept. 25, 1945.   R. A. DARBY   2,385,499
FUSELAGE BULGE
Filed May 19, 1943   2 Sheets-Sheet 2

INVENTOR
ROBERT ALAN DARBY
BY
ATTORNEY

Patented Sept. 25, 1945

2,385,499

UNITED STATES PATENT OFFICE 2,385,499

FUSELAGE BULGE

Robert A. Darby, Buffalo, N. Y., assignor to Curtiss-Wright Corporation, a corporation of Delaware Application May 19, 1943, Serial No. 487,832

1 Claim. (Cl. 244—129)

This invention relates to airplanes and more particularly to means for modifying the aerodynamic characteristics thereof after construction in order that rudder control loads may be reduced.

Once in a while it is found after the airplane has been constructed according to a predetermined paper design that the finished airplane has too much directional stability or is stiff, thereby making the rudder control of the airplane difficult and tiresome for the pilot. This high degree of directional stability is due to a long tail length, a short fuselage length ahead of the center of gravity, a deep flat-sided fuselage aft of the center of gravity, or a combination of any two of these three items or of the three altogether. Unless the vertical tail area is made very low, such an airplane will be stiff directionally, and if the vertical tail area is reduced enough to give normal directional stability, the rudder area available will be too low for good control.

It is, therefore, an object of the present invention to provide means for correcting aerodynamically an airplane already designed and in production to render it more sensitive to a controlling rudder and indirectly reduce the pilot's required control force.

It is another object of the invention to provide means for changing the directional stability of the airplane without the need for rectifying the control surfaces.

According to the present invention bulged patches or blisters are applied over the skin of a production airplane to increase directional control by reducing the static directional stability. These are applied rearwardly of the center of gravity of the airplane and on the tail portion of the fuselage. By so doing the center of pressure of the fuselage in yaw is in effect moved forward and the restoring moment at angles of yaw is reduced. The patches, in order to be located well rearwardly on the fuselage, are faired into the lower surface of the horizontal stabilizer.

For other objects and for a better understanding of the invention, reference may be had to the following detail description taken in connection with the accompanying drawings, in which Fig. 1 is a phantom view of an airplane, in elevation, having characteristics which give it a tendency to be stiff and difficult to control about a vertical axis through the center of gravity and with the bulging formation thereon forming the feature of the present invention.

Figure 1:
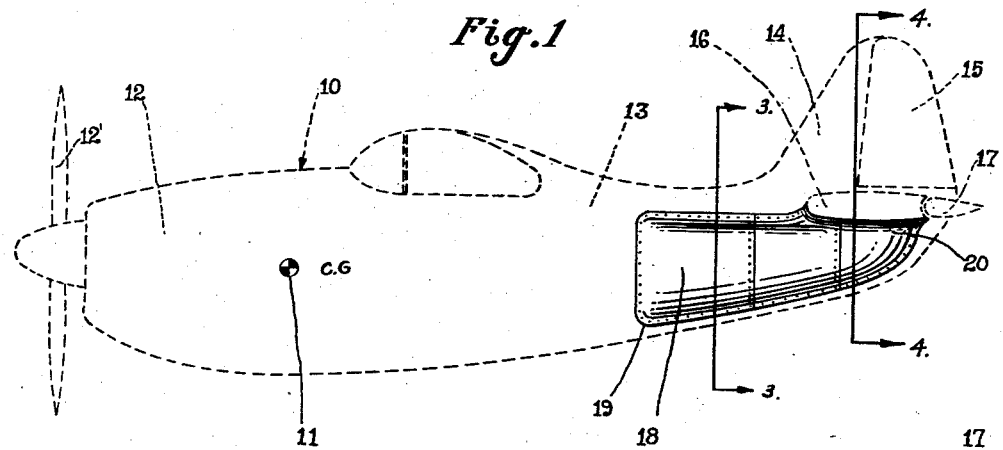
Figure 2:
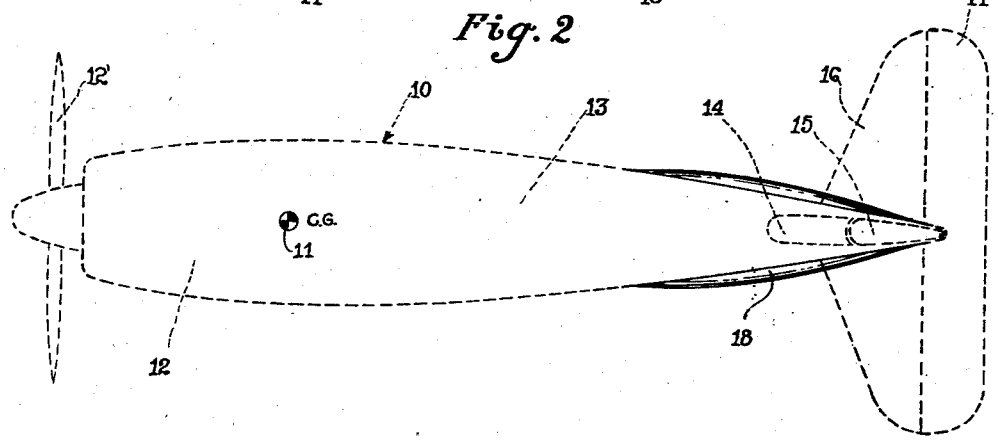
Fig. 2 is a plan view of the airplane shown in Fig. 1.
Figure 3:
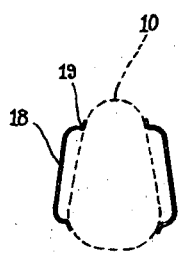
Fig. 3 is a sectional view, in elevation, taken through the tail of the airplane and the bulging formation, as viewed along line 3—3 of Fig. 1.

Referring now to Figs. 1 to 6, there is shown an airplane 10 having a center of gravity 11, a nose portion 12 forwardly of the center of gravity and a tail portion 13 rearwardly of the center of gravity. This airplane has a nose portion with its propeller 12' of relatively short length forwardly of the center of gravity and a tail portion of considerable vertical depth and having deep flat sides. Each of the airplanes shown in Figs. 1 and 5 has a vertical fin 14 and a cooperating rudder 15, but the rudder 15 in Fig. 5 extends downwardly the full height of the tail and to a point below a horizontal stabilizer 16 which has a cooperating elevator 17 thereon.

The airplane thus described would be typical of an airplane which has been constructed but later found to have faults which cause the airplane to be difficult to control directionally. This type of airplane is so directionally stable that great effort would have to be placed on the rudder by the pilot in order for the desired turning movement to be given to the airplane. According to the invention and in order to render the finished airplane less stable directionally, there is provided a bulging patch 18 having flanges 19 by means of which the patch is secured to the tail portion 13 of the airplane.

Figure 4:
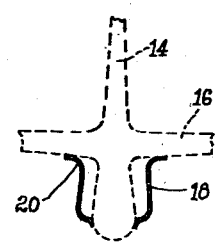
Fig. 4 is a sectional view, in elevation, taken through tail of the airplane rearwardly removed from section 3—3 and along line 4—4 of Fig. 1.
Figure 5:
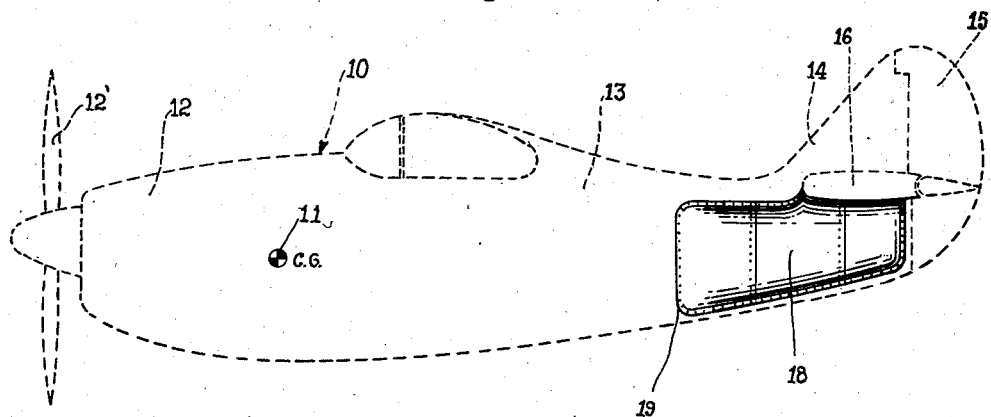
Fig. 5 is a view similar to Fig. 1 of a slightly different form of airplane and of the bulging formation adapted for use with this type of an airplane.
Figure 6:
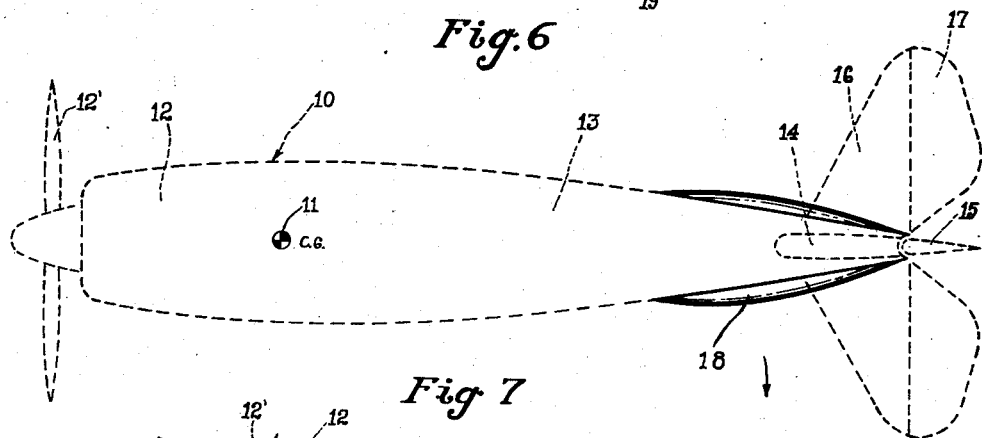
Fig. 6 is a plan view of the form of airplane shown in Fig. 5.

This bulging patch 18 can be made of one or more sections of sheet material secured together and fastened at the rearward end to fit underneath the horizontal stabilizer and to fair into the lower surface thereof as shown at 20 in Fig. 4. With the airplane having the tail surfaces shaped as in Fig. 1, the patch extends rearwardly to a further extent than in the form of airplane shown in Fig. 5. In Fig. 1 the patch extends to a location under the rudder 15, whereas in Fig. 5 it extends only to the rudder. In either case it should be noted that the patch is located as far rearwardly as possible on the tail portion 13 of the airplane.

Figure 7:
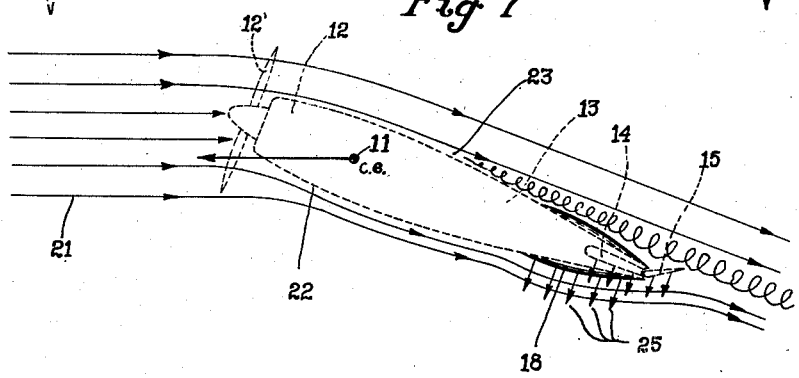
Fig. 7 is a diagrammatic view of an airplane illustrating the operation of the present invention as the airplane is being side-slipped into the wind.

Referring now particularly to Fig. 7, there is shown diagrammatically the action of air over the surfaces of the airplane as the airplane rudder is turned to yaw the airplane about its center of gravity and to throw the airplane into a condition of side slip as is often done when the airplane is being landed.

The velocity of the wind relative to the fuselage of the airplane is now as indicated by the arrows 21, when the airplane is sideslipping to the left and yawing to the right. The flow of air over the fuselage on the pilot's right will separate from the body surface ahead of the bulge patch, as at 23, at medium to large angles of yaw, and the patch on this side of the fuselage will have no aerodynamic effect. On the left hand side of the fuselage, however, the flow of air adheres to the body along its entire length. When the flow meets the bulge patch 18, the curvature of the bulge causes a local increase in the velocity along the streamlines adjacent to the bulge, and a resulting decrease in static pressure, in accordance with the theorem of Bernoulli. This local reduction in static pressure, equivalent to a motion, over the bulge, is represented by the force vectors 25, which are seen to exert a yawing moment about the center of gravity of the airplane that is opposite in direction to the normal stabilizing, or restoring, moment of the fuselage. This action of the bulge 18, in yaw, makes necessary less controlling moment from the vertical tail than would be required without the bulge, and thus a smaller rudder throw and lower pilot pedal force.

While various changes may be made in the detail construction and in the form of the bulging patch, it shall be understood that such changes shall be within the spirit and scope of the present invention as defined by the appended claim.

I claim as my invention:

In combination, an airplane with a fuselage so designed and constructed as to render it difficult to sideslip or yaw the airplane with its rudder, a horizontal stabilizer secured to the fuselage, and bulging patches secured to the sides of the fuselage at a location thereon beneath the horizontal stabilizer, said patches so fashioned as to fair into the horizontal stabilizer.

ROBERT A. DARBY.